United States Patent [19]

Takagi et al.

[11] Patent Number: 4,677,020
[45] Date of Patent: Jun. 30, 1987

[54] FIBER REINFORCED PLASTIC PRODUCT AND METHOD OF FORMING PRODUCTS

[75] Inventors: Koichi Takagi; Shunichi Hayashi, both of Nagoya, Japan

[73] Assignee: Mitsubishi Jukogyo Kabushiki Kaisha, Tokyo, Japan

[21] Appl. No.: 765,198

[22] Filed: Aug. 13, 1985

[30] Foreign Application Priority Data

Sep. 11, 1984 [JP] JapanZ ............................ 59-188947

[51] Int. Cl.⁴ .................................................. D04H 1/04
[52] U.S. Cl. ..................................... 428/294; 428/377; 264/103; 264/255; 264/271.1
[58] Field of Search ............... 264/103, 255, 257, 258, 264/271.1, 279.1; 428/294, 377

[56] References Cited

U.S. PATENT DOCUMENTS

| 4,020,202 | 4/1977 | Kreft | 428/33 |
| 4,097,626 | 6/1978 | Tennent | 428/36 |
| 4,320,160 | 3/1982 | Nishimura et al. | 428/107 |
| 4,420,523 | 12/1983 | Wieme | 428/109 |
| 4,451,041 | 5/1984 | Hayashi et al. | 273/167 H |
| 4,469,730 | 9/1984 | Burhans | 421/36 |
| 4,495,231 | 1/1985 | Laskaris et al. | 428/36 |
| 4,581,190 | 4/1986 | Nagamoto et al. | 264/136 |

FOREIGN PATENT DOCUMENTS 58-12859   3/1983 Japan .
58-214085 12/1983 Japan .

Primary Examiner—John L. Goodrow
Assistant Examiner—Patrick J. Ryan
Attorney, Agent, or Firm—Wenderoth, Lind & Ponack

[57] ABSTRACT

A moulded product of a fiber reinforced plastic comprises a core consisting of a plastic matrix admixed with relatively short fibers and an outer circumferential section or a specific local section consisting of a plastic matrix admixed with relatively long fibers. This invention also provides a blank of fiber reinforced plastic formed preliminarily to a given form comprising a core section consisting of a plastic matrix admixed with relatively short fibers and an outer circumferential section or a specific local section consisting of a plastic matrix admixed with relatively long fibers. Also, this invention is concerned with a method of forming a fiber reinforced plastic product having the improved character noted above.

10 Claims, 50 Drawing Figures

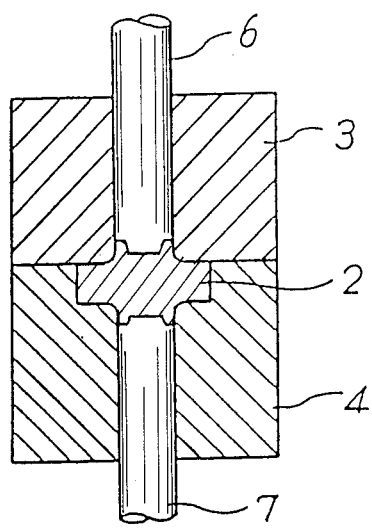
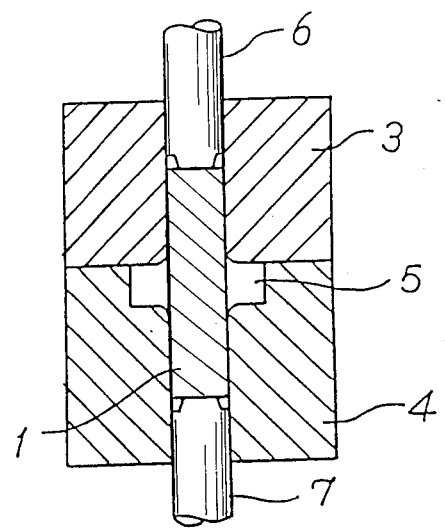
FIG. 1   FIG. 2
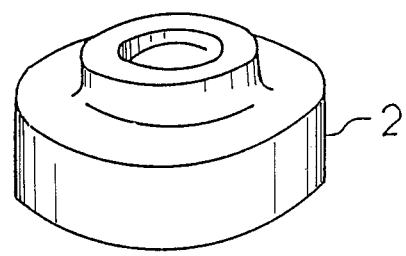
FIG. 3   FIG. 4

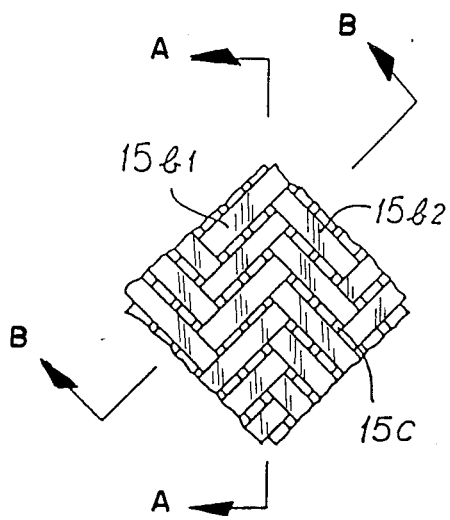
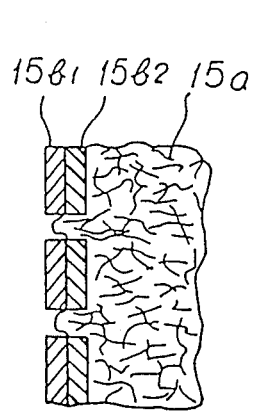
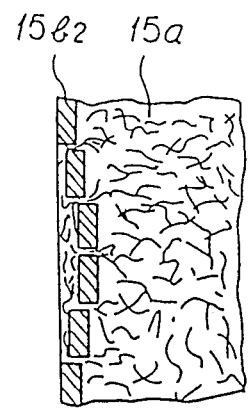
FIG. 17　　　　　FIG. 18　　　　FIG. 19
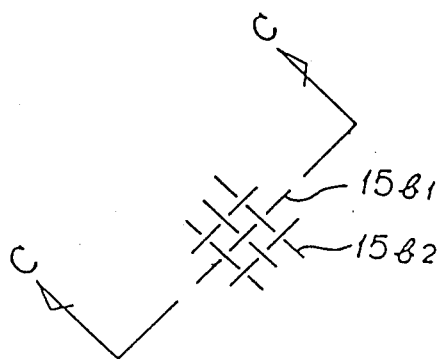
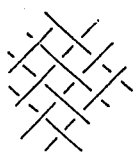
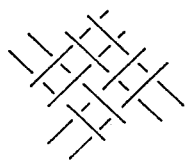
FIG. 20　　　　FIG. 21　　　　FIG. 22

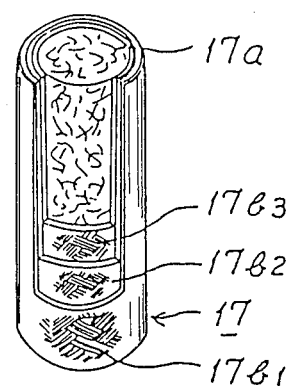
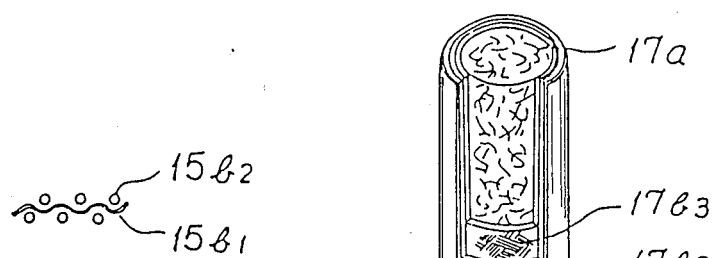
FIG. 23
FIG. 24
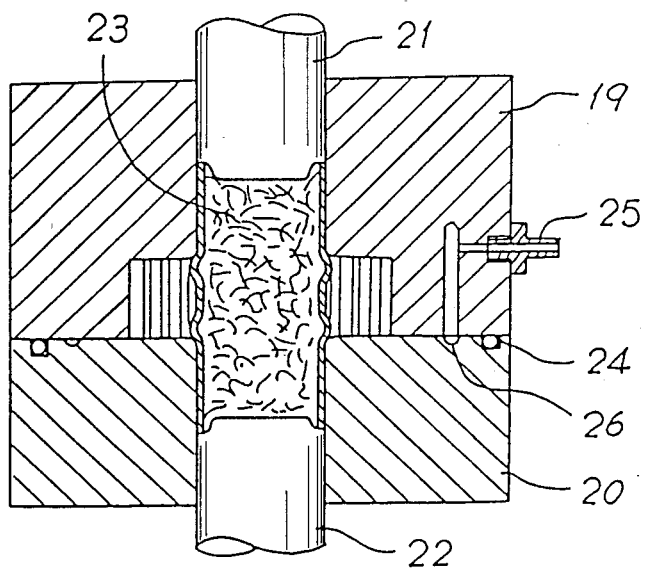
FIG. 25

FIBER REINFORCED PLASTIC PRODUCT AND METHOD OF FORMING PRODUCTS

BACKGROUND OF THE INVENTION

1. Field of the Invention

The present invention relates generally to products of fiber reinforced plastics and to an improved method of forming fiber reinforced plastics, and more particlarly to improved products of fiber reinforced plastics which have their cores reinforced with a relatively short fiber and have their outer circumferences reinforced with a relatively long fiber, and to an improved forming process therefor.

2. Description of the Prior Art

It is commonly known that fiber reinforced plastic products or parts in general can be manufactured by way of such processes as hand-layup, pressurized bagging, resin injection, etc.

Also, for the plastic forming processes utilizing the directivity of long fibers, the following processes are commonly adapted; the filament winding process, the continuous drawing process, the continuous lamination process, etc.

Referring further to the typical examples of such conventional plastic forming processes as raised above, it is known that the former processes are typically adaptable to the working of sheet material, and the latter processes cannot be adapted to the formation of products having complicated shapes, which would then be an obstacle to the extensive application with such certain restrictions in use for the general plastic forming operation, and in addition with a rather low productivity.

In consideration of such inconveniences and restrictions in use which are particular to the conventional processes, there is a desire to provide an efficient resolution therefor.

The present invention is essentially directed to the provision of a due and proper resolution to such inconveniences and restrictions in practice as reviewed above and experienced in practice of these conventional processes, which have been left unattended with any proper countermeasures so far.

SUMMARY OF THE INVENTION

It is therefore a primary object of the present invention to provide an improved plastic product and an improved process of forming the plastic products in which the advantageous directivity of relatively long fibers are made available in the manufacture of even large products having complicated sectional shapes.

It is another object of the invention to provide an improved plastic product and an improved process of forming the plastic products in which an excellent productivity, production yield and accuracy in finishing are attainable in practice.

The above objects of the invention can be attained efficiently from the improved plastic product which, as summarized in brief, has its core reinforced with relatively short fibers and its outer circumferential area or its specified local areas reinforced with relatively long fibers, respectively.

These objects can also be attained from the improved process of forming plastic products, which comprises, as summarized in brief, the steps of placing a plastic blank including fibers to be formed having a continued cross-sectional surface in the enclosed cavity of a mould or die, forcing the plastic blank to be compacted under pressure by using a punch or squeezing tool, and controlling the heating of the die to a predetermined temperature.

According to the improved construction of the present invention as reviewed above in brief, it is to be noted that there is obtained such an advantageous function from the improved construction of the plastic product that can be reinfored in concentration at its specific area where such a specific property as strength, wear resistance and the like are required, by having its core reinforced with relatively short fibers and having its outer circumference or its specified local area reinforced with relatively long fibers.

Also, there is attained such an advantageous effect of the process for forming a plastic product comprising the steps of charging an enclosed mould or die with a fiber-containing plastic blank under pressure and having a continuous cross-sectional surface, forcing the plastic blank to be compacted by using a punch or compacting tool while controlling the temperature of the mould, causing gaps defined between long fibers contained in the plastic structure to be expanded temporarily during the stage that the plastic blank expands in a direction perpendicular to the direction of compacting within the enclosed cavity of the mould, thereafter having the gaps shrinked, having short fibers contained in the plastic blank caught in the gaps between the long fibers during the expansion stage, thus having the short fibers entangled or anchored with the long fibers by the subsequent shrinkage of the gaps in the plastic structure, and thus resulting in an excellent means for preventing separation among the fibers in the use of the plastic product.

The principle, nature and details of the present invention, as well as advantages thereof, will become more apparent from the following detailed description by way of the preferred embodiment of the invention, when read in conjunction with the accompanying drawings, in which like parts are designated by like reference numerals.

BRIEF DESCRIPTION OF THE DRAWINGS

In the drawings;

FIG. 1 is a longitudinal cross-sectional view showing the improved method of forming a moulded product of fiber reinforced plastic by way of a preferred embodiment of the invention;

FIG. 2 is a similar longitudinal cross-sectional view showing a plastic forming mould;

FIGS. 3 and 4 are perspective views showing a plastic blank to be moulded and a finished plastic product, respectively;

FIGS. 5 through 8 are illustrations of other embodiments of the invention, in which FIGS. 5 and 6 are perspective views showing a plastic blank to be formed and a plastic forming mould, respectively; and FIGS. 7 and 8 are longitudinal cross-sectional views showing the moulding procedures using the plastic blank and mould shown in FIGS. 5 and 6, respectively;

FIG. 17 is a front elevational view showing the state of deformation of a moulding blank shown in FIG. 13 as observed while in a mould;

FIGS. 18 and 19 are fragmentary cross-sectional views taken along the lines A—A and B—B in FIG. 17, respectively;

FIGS. 20 through 22 are schematic views showing alternative examples of braiding used in a plastic blank to be moulded, respectively;

FIG. 23 is a schematic view taken along the line C—C in FIG. 20;

FIG. 24 is a perspective view, partly cut-away, showing a plastic blank structure by way of still another embodiment of the invention;

FIG. 25 is a longitudinal cross-sectional view showing a process of the invention by way of a still further embodiment thereof;

FIGS. 43 through 46 are schematic views showing further examples of plastic blanks, in which FIG. 43 is a longitudinal cross-sectional view and FIGS. 44 through 46 are perspective views, respectively;

DETAILED DESCRIPTION OF THE INVENTION

Figure 5:
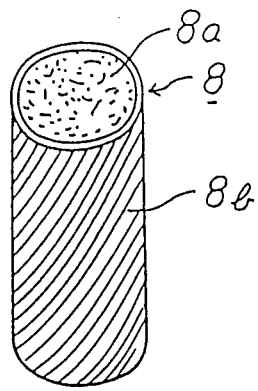
Figure 6:
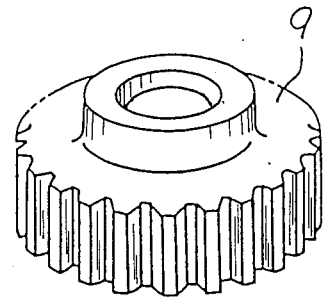
Figure 7:
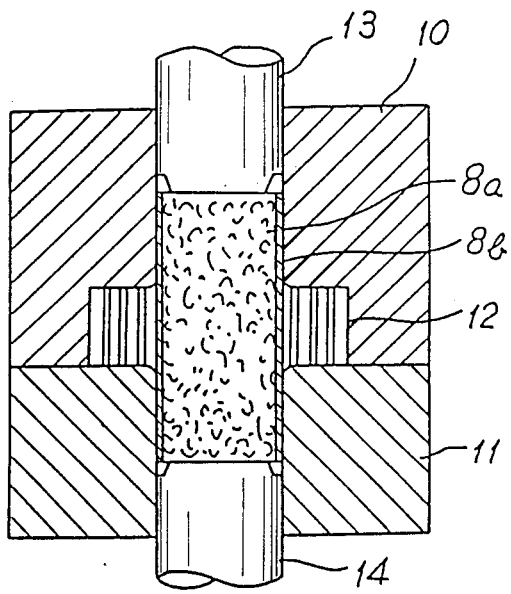
Figure 8:
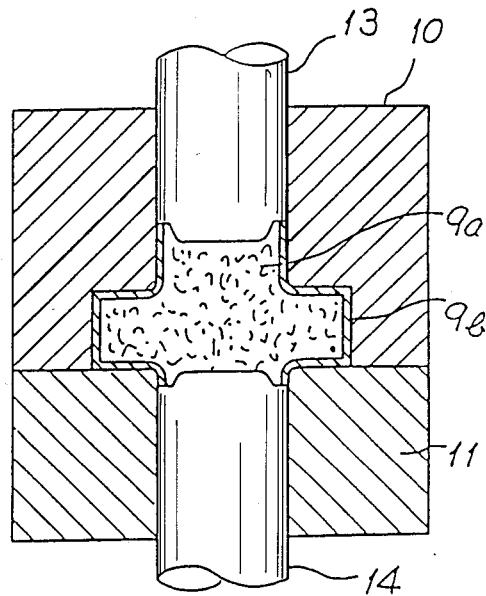

The present invention will now be described in detail by way of example with, but not by restriction in any way to, preferred embodiments thereof in conjunction with the accompanying drawings, as follows.

Now, referring to FIGS. 1 and 4, there is shown an improved moulding procedure for attaining a finished plastic product 2 shown in FIG. 4 from a fiber reinforced plastic blank 1 shown in FIG. 3 by way of a preferred embodiment of the invention. According to this procedure, it is seen in FIG. 2 that there is firstly disposed a plastic blank 1 in the cavity defined between an upper mould half 3 and a lower mould half 4, thereafter these mould halves 3, 4 being closed together. When an upper punch or urging tool 6 and a lower punch 7 are forced together with each other, the plastic blank 1 is then urged into the form of a finished plastic product 2 expanding into the whole cavity or clearance 5 in the mould. In this connection, there may be provided the upper and lower mould halves 3, 4 and also the upper and lower punches 6, 7 which are controllable with their degree of heating in the generally known manner according to the kind of the plastic blank 1 to be moulded, so that it may be softened or hardened, accordingly.

As a plastic blank 1 to be moulded, there is generally made available a plastic matrix containing long and short fibers therein, and such fibrous inorganic matters as carbon, glass fiber, metals, ceramics, etc. and such fibrous organic matters as alamide, etc., and/or the combination thereof may be adapted to be mingled together in the plastic matrix. Also, as a matrix for this use, either a thermoplastic resin or a thermosetting resin may be used, and for example, such plastic resins may be employed as polyamide, an epoxy resin, an unsaturated polyester, a vinyl ester resin, and the like.

When it is a thermoplastic resin, at the stage of the plastic blank there are previously admixed such chemicals as a bulking agent, a mould releasing agent, a hardening agent, a thickener, a stabilizer, a coloring agent, etc., while when it is a thermosetting resin, it is adapted to use at the tack free stage or at the so-called B stage of plastic working.

Referring to FIGS. 5 through 8, there is shown an exemplary case that the present invention is adapted to the manufacture of a gear, in which a moulding blank 8 is shown comprising an area of short fibers 8a in the core thereof where a plastic matrix is admixed with short fibers, and an outer circumferential area of longer fibers 8b where a plastic matrix is admixed with longer fibers. When thus-prepared moulding blank 8 is placed in position between a pair of moulds 10, 11 shown in FIG. 7 and thereafter compressed under pressure rendered from a pair of upper and lower urging tools or punches 13, 14, the blank 8 will be deformed and expand into clearance 12 defined in the pair of moulds 10, 11 having a configuration of gear teeth therein, thus turning to be a spur gear 9 shown as a finished product in FIG. 6, which has its core of short fiber section 9a and its outer circumferential area of longer fibers 9b having gear teeth shaped accordingly. In this practice, it is preferred to control the temperatures of the mould and the urging punches to a specified point in accordance with the common practice, and this will be true with all further embodiments of the invention to follow. Therefore, no further reference will be made to such temperature controls in the following description. While it is generally known to those skilled in the art that the urging force of the pair of punches 13, 14 to be applied in the practice of plastic formation is to be decreased to a specified point at a certain stage that the curing of the plastic matrix ceases and turns into the C-stage of plastic working, thus preventing the moulded product from being damaged, accordingly, this makes no part of the present invention, and no further reference will be made to it in the following description.

Figure 9:
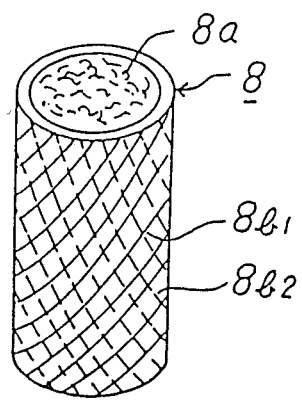
FIG. 9 is a perspective view showing a plastic blank to be moulded.
Figure 11:
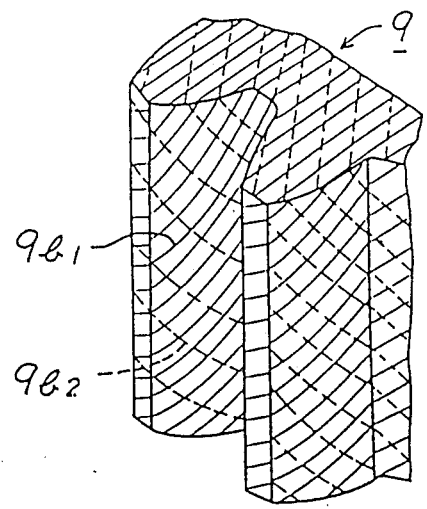
FIG. 11 is a fragmentary perspective view showing a finished product which is moulded from the blank shown in FIG. 9.
Figure 10:
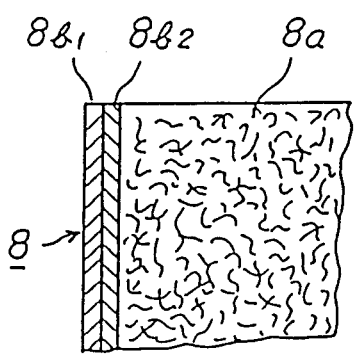
FIG. 10 is a fragmentary longitudinal cross-sectional view showing the structure of the plastic blank shown in FIG. 9.

FIGS. 9 through 12 show further embodiments of the invention, in which there is provided an outer circumferential area of longer fibers 8b in a plastic blank, which consists of a continuous fibrous layer extending rising in the upper right direction $8b_1$ formed in the outermost circumference thereof and a continuous fibrous layer extending rising in the upper left direction $8b_2$ disposed in the radially inward area thereof. More specifically, in such an embodiment, there exist a multiplicity of circumferential layers of fibers having a fiber diameter ranging from several microns to ten microns or so disposed with a generally uniform thickness in that area of longer fibers. FIG. 10 shows in further detail the cross-section of an outer circumferential area of the moulding blank 8. In this construction shown, the outer surface of a finished product spur gear 9 is, as typically shown in FIG. 11, formed in such a manner that there exist layers of longer fibers $9b_1$ and $9b_2$ which extend intercrossing with each other. In this connection, it is generally known that the product of fiber reinforced plastics would exhibit such physical properties as a maximum strength, a maximum rigidity, etc. along the orientation of fiber extension against a stress rendered thereupon, while such properties would attenuate sharply when the stress may deflect out of the orientation of fiber extension.

Figure 12:
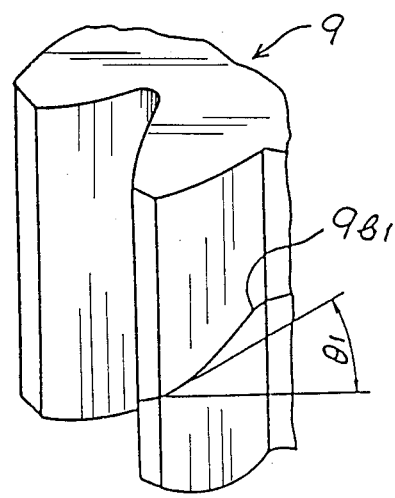
FIG. 12 is an illustrative representation showing an angle of rake with respect to the horizontal line in a layer of long fibers of a finished product.

In this respect, therefore, according to the practice of design engineering of a spur gear, an angle of rake $\theta_1$ defined between the orientation of fibers and the direction of main stresses as seen in FIG. 12 has a significant factor in the gear design. This angle $\theta_1$ may be determined from such factors as the orientation of fibers involved, the dimensions of a plastic blank, and the configuration, dimensions and moulding conditions of a finished product, and the basic design concept will be presented by way of simplified models referring to FIGS. 13 through 16, as follows.

While the construction of the moulding blank 8 having the disposition of longer fibers shown in FIG. 9 would exhibit an advantageous feature that it may be manufactured with ease, there is a fear that a departure of fibers in a certain area of longer fibers extending in the same orientation would occur, when there is applied a greater extent of forming under compacting force, thus making the area of short fibers appearing from under the area of longer fibers. On the other hand, according to the construction of moulding blank 15 having a braiding arrangement in the outer circumference thereof shown in FIG. 13, there extend intercrossing strands $15b_1$ and $15b_2$, and with this construction, when there is rendered an inner pressure during a stage of pressure forming, there would be an increase in circumference of the blank while shrinking in the longitudinal direction thereof, as schematically shown at the reference numeral 16 in FIG. 14. By virtue of such an advantageous construction of the blank that the strands $15b_1$ and $15b_2$ extend intercrossing with each other in an alternatingly braided manner, there would be no chance of irregular local expansion from a generally uniform inner pressure, thus bringing less risk of partial appearance of the inner area of short fibers under the area of longer fibers as stated above in connection with FIG. 9. Furthermore, as typically shown in the cross-sectional view in FIG. 15, since the outer dimensions $l_2$ and $d_2$ of the blank upon the compacting formation are closely related to the volume thereof, it is essential in practice to pay special consideration to design engineering such as giving a suitable recess 16c or the like for relieving the stress of expansion, when necessary. In this figure, there are shown an area of short fibers at 16a and an area of longer fibers with the braiding 15b being deformed.

Figure 13:
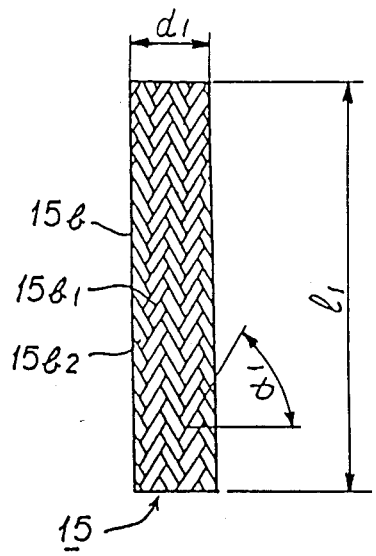
FIG. 13 is a front elevational view showing an exemplary plastic blank in which there is provided a braiding arrangement in the outer circumference thereof.
Figure 16:
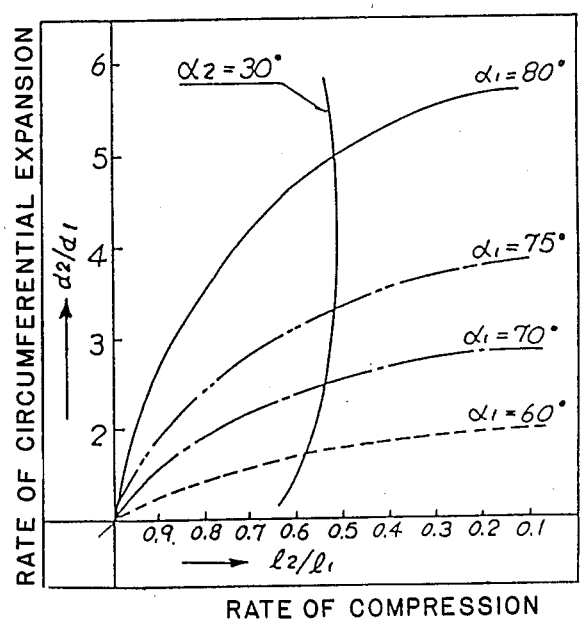
FIG. 16 is a graphic representation illustrating the relationship of deformation observed in the dimensions and angle of rake of the blank while in a compacting moulding stage thereof.
Figure 26:
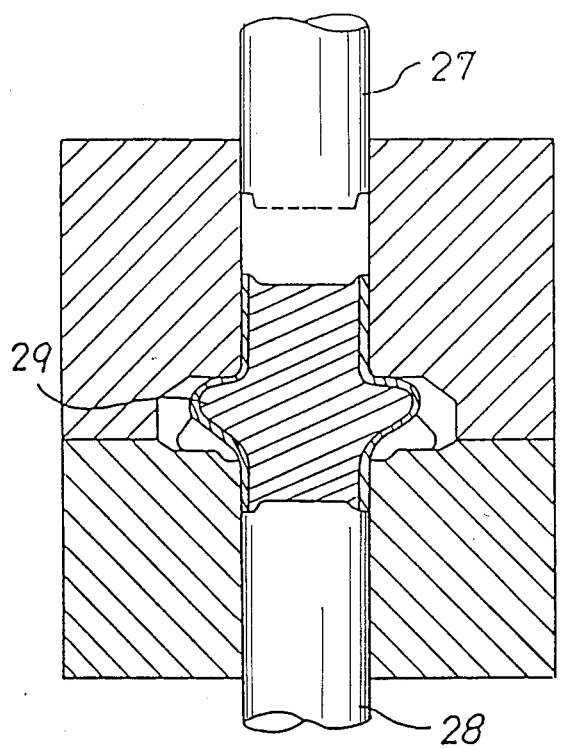
FIGS. 26 and 27 are longitudinal cross-sectional views illustrating the moulding steps of the process of the invention by way of a further embodiment thereof.

Now, referring to FIG. 16, there is shown a graphic representation which shows the relationship of theoretical values observed exclusively in terms of the deformation in the mesh of the strands $15b_1$ and $15b_2$ with respect to a diameter $d_2$ as taken with a length $l_2$, which is obtained from compression of the length $l_1$ of the moulding blank 15 having the diameter $d_1$ shown in FIG. 13. This graph represents the plottings with four different initial angles of inclination $\alpha_1$, and from this it is essential to determine the dimensions of the blank and the arrangement of strands in consideration of the general configuration of the blank as well as the angle of inclination $\alpha_2$ as required in this embodiment, because of an actual limit in the diameter $d_2$ of the blank which can be extended in practice without breaking or forced elongation of the strands involved.

Figure 14:
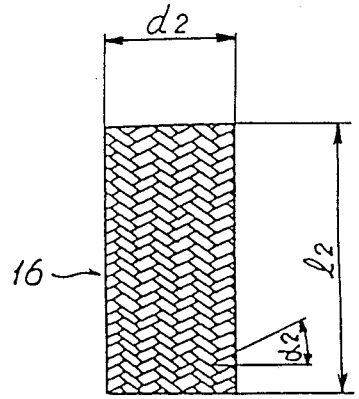
FIGS. 14 and 15 are a front elevational view and a fragmentary cross-sectional view showing the state of deformation in a braiding arrangement of the plastic blank in a mould.
Figure 15:
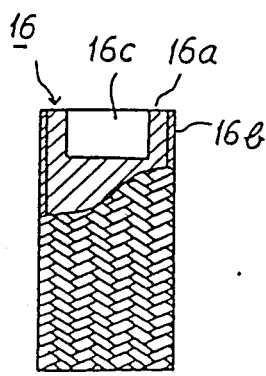

It is seen from FIG. 16 that the curve with $\alpha_2 = 30$ degrees is plotted from the theoretical value of angle of tension working upon the strands, under the assumption that there is rendered a uniform inner pressure upon the cylinder of the blank shown in FIG. 14, which may be a target allowing a maximum expansion in diameter of the blank, when it is urged in the vertical direction having its diameter $d_2$ expanded to a greater extent.

In the actual observation, while it is seen that the angle $\alpha_2$ would tend to incline at 30 degrees or smaller under the compacting effort working upon the strands per se in the axial direction of the blank, with the resistance between the strands, the mould and the area of short fibers of the blank serving in the direction making the angle $\alpha_2$ 30 degrees or greater, or maintaining the angle $\alpha_1$, there is merely a small difference therebetween, and therefore, this angle of 30 degrees can be made a proper target of engineering. While it is observable that the actual deformation in these strands cannot be so simple with a variety of finished products as reviewed hereinbefore, this concept may equally be adapted properly to any finished product having a more complicated shape, with such an assumption, for instance, that the length of a curved surface along the flank of a gear as observed in the spur gear 9 may equal the outer circumference of the cylinder $\pi d_2$ shown in FIG. 14.

FIG. 17 shows a state that the moulding blank 15 of FIG. 13 is compressed along its axial direction with its angle of inclination of braiding $\alpha_2$ turning to be generally 45 degrees, in which state there is formed a gap or clearance 15c between the strands in the outer surface of the braiding arrangement of the blank. In FIG. 18 which is a longitudinal cross-sectional view showing part of the outer circumferential area of the blank taken along the line A—A in FIG. 17, it is seen that the area of short fibers 15a under inner pressure from the compression of the blank is urged to expand outwardly through these gaps of the strands, and then some of the short fibers would tend to shift over the outer surface of the layer of strands as typically shown in FIG. 19 which is a fragmentary cross-sectional view taken along the line B—B. In this construction, the extent of this gap 15c may be controlled by way of the configuration or density of braiding. There is a trend that the component of plastic matrix in the area of short fibers 15a would extrude rather than the short fibers, with the remaining content of rich short fibers turning to block the gaps 15c between the strands, and there is thus no fear that the content of short fibers 15a would then be prevented from being extruded out of the gaps of strands to an excessive extent. Such a state of entanglement of the short fibers with the area of longer fibers may bring such a marked effect that the departure between the layers of short and longer fibers can be prevented from occurring during the use of the finished product. Also, in consideration of the fact that these gaps 15c may turn to shrink again as the process of compacting moulding of the plastic blank progresses, there is obtained a desired state such that the content with rich short fibers may be left entangled with these gaps 15c. FIGS. 20 through 22 show other examples of the braiding arrangement in the plastic blank which are prepared by the braiding machine, and FIG. 23 is a fragmentary cross-section view taken along the line C—C in FIG. 20, showing schematically the typical manner of braiding of the strands. A variety of braiding arrangements may be adapted in accordance with the configuration, material and dimensions of the moulding products.

FIG. 24 is a perspective view showing an alternative construction of a plastic blank 17 in which there are provided three layers of braiding $17b_1$, $17b_2$ and $17b_3$ provided in the outer circumference of the area of short fibers. While not shown, there may be made available such a construction of a moulding blank that includes a plurality of layers of longer fibers of FIG. 9, or of the combination of such laminar structures, according to the use of such blanks.

FIG. 25 is a longitudinal cross-sectional view showing a process of plastic formation by way of a further embodiment of the invention, in which there is shown a state of compression of a moulding blank 23 placed in the cavity of the mould halves 19, 20 and under pressure rendered by a pair of upper and lower punches 21, 22. This is an example of a vacuum moulding process, in which there are provided an O-ring 24 near the outer circumference of the mould, a nipple 25, and an annular groove 25, which are designed to provide a vacuum or reduced pressure within the cavity of the mould in cooperation with the mating surfaces of the mould halves, when there is generated a vacuum therein. With this arrangement, when the air is drawn from the cavity of the mould during the moulding operation, there is attained such an advantageous effect that the bubbles may be excluded from the moulding blank 23, thus eliminating the formation of voids in the finished product, and thus resulting in a uniform and improved property of the product, and moreover, avoiding such risks that such bubbles may be captured in the enclosure defined by the mould and the moulding blank, thus seizing and burning the blank in its surface from adiabatic compression, and thus producing weld lines.

Figure 27:
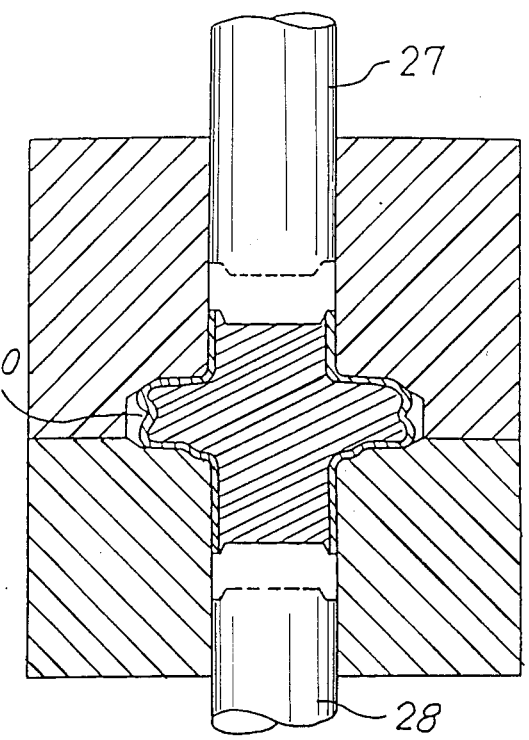
Figure 28:
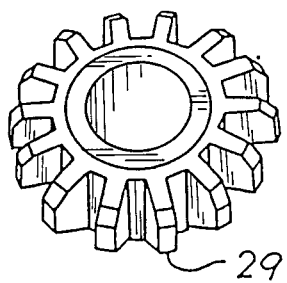
FIGS. 28 and 29 are a perspective view and a longitudinal cross-sectional view showing a finished product, respectively.
Figure 29:
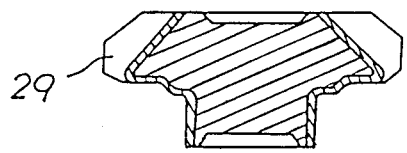

In connection with this process, there is shown a further embodiment of the invention, where it is specifically designed to provide a relatively great stroke of compression of an upper punch 27 and a relatively small stroke of compression of a lower punch 28 so that there may be provided a greater extent of spreading or deformation of a plastic blank in the upper part thereof than the lower portion thereof. More specifically, this specific arrangement may be adapted to the formation of a bevel gear shown in FIG. 28, the cross-section of which is shown in FIG. 29. While the extent of formation of a plastic blank depends upon moulding factors such as the type and quantity of fibers to be admixed, the property of a plastic matrix, the temperature of a mould, the velocity of urging punches, etc., it is generally known that a greater extent of deformation may be observed on the side of a plastic blank where an urging punch has a greater stroke of compression, and consequently, it is essential that the stroke of compression of a compressing punch be determined in consideration of such factors as the final shape of a moulding product, the disposition of split surfaces of a mould, the escape of air, etc. FIG. 27 shows an improper example in which there was eventually generated a weld line 30, because of an equal speed applied to the both upper and lower urging punches, together with the effect of resistance as produced in the formation of gear teeth at the final stage of deformation.

Figure 30:
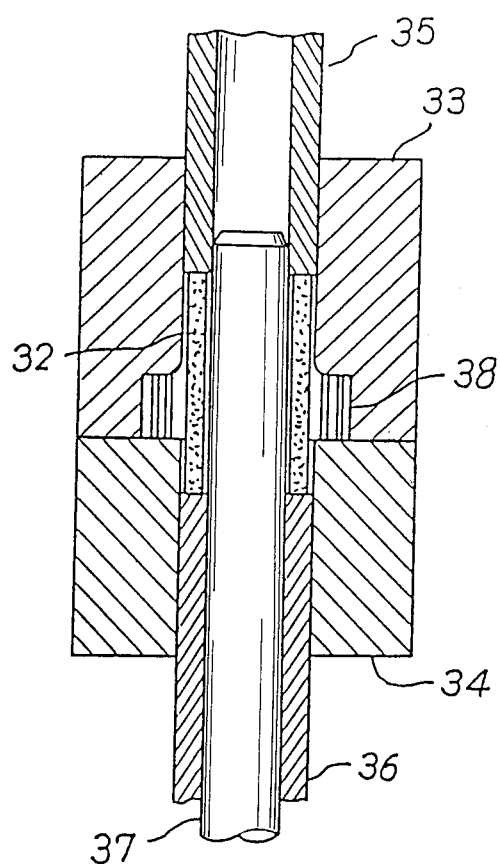
FIGS. 30 and 31 are longitudinal cross-sectional views illustrating the moulding steps of the process of the invention by way of an alternative embodiment thereof, respectively.
Figure 31:
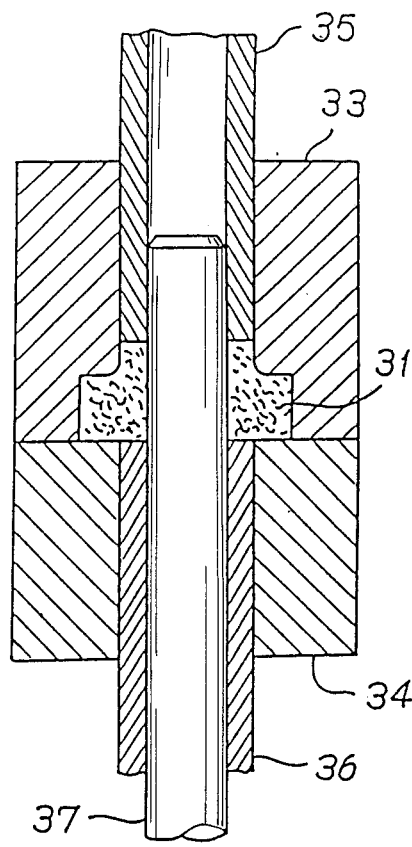

There is shown a further embodiment of the invention in FIGS. 30 and 31, in which there are provided a rod or shaft 37 in the center of a cylindrical blank 32, and a pair of compression punches 35, 36 mounted movable in mould halves 33, 34, in such a manner that the punches may force the blank to be compressed to a finished product 31 having a central opening as shown in FIG. 31. In FIG. 30, there is defined a cavity or opening 38 having gear teeth formation of the mould 33.

Figure 32:
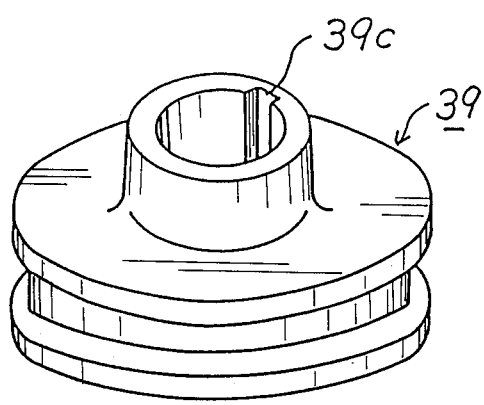
FIGS. 32 and 33 are perspective views showing a finished product and a plastic blank to be moulded, respectively.
Figure 33:
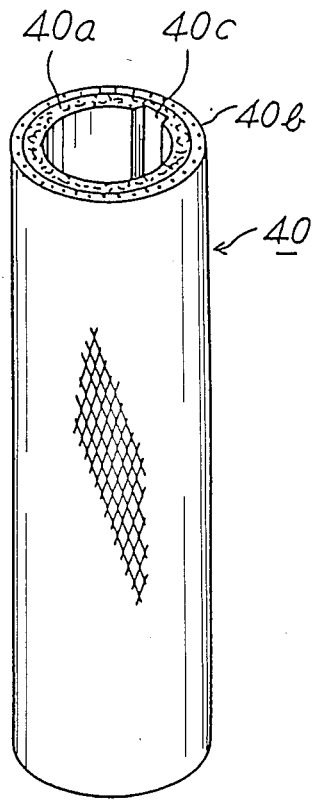

FIGS. 32 and 33 are perspective views showing a moulding product and a plastic blank to be adapted to the process according to the invention by way of a further embodiment thereof. FIG. 32 shows an example in which there is provided a pulley 39 with a central opening having a key way 39c by the employment of a forming shaft 37 defined with a ledge extending longitudinally, and FIG. 33 shows a plastic blank 40 to be moulded to the shape shown in FIG. 32. In this blank, there are provided a layer of short fibers 40a, a layer of longer fibers 40b, and a longitudinal groove preformed correspondingly to the key way 39c to be formed.

Figure 34:
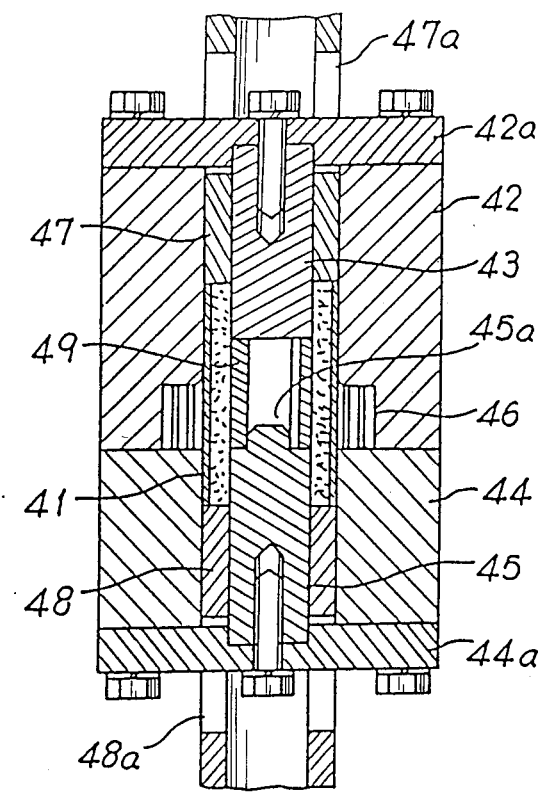
FIGS. 34 and 35 are longitudinal cross-sectional views showing the moulding steps of the process of the invention by way of an alternative embodiment thereof, respectively.
Figure 35:
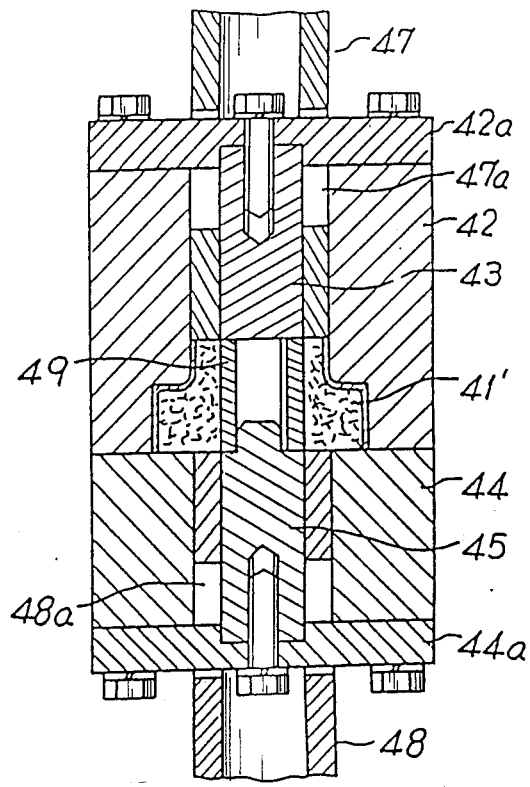
Figure 36:
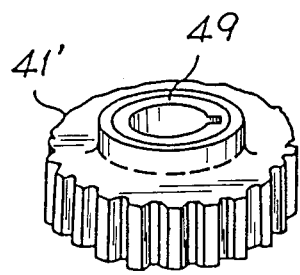
FIGS. 36 and 37 are a perspective view and a longitudinal cross-sectional view showing a further finished product, respectively.
Figure 37:
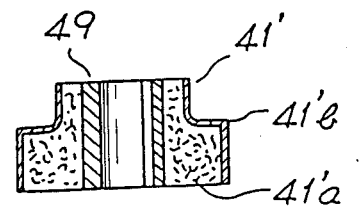

FIGS. 34 and 35 are longitudinal cross-sectional views showing a further embodiment of the invention, in which there is shown a sequence of working for the formation of a spur gear 41′ as shown in a perspective view of FIG. 36 and a cross-sectional view of FIG. 37 from a blank 41, respectively. This product gear 41′ is formed to use a sleeve 49 in the center thereof. In FIGS. 34 and 35, there are provided an upper mould half 42, an end plate 42a, a shaft 43, a lower mould half 44, an opposite end plate 44a, an opposing shaft 45, a projection 45a, a cavity defined between both mould halves 46, an upper punch 47, a window opening 47a, a lower punch 48, another window opening 48a, a section of short fibers 41′a, and a section of longer fibers 41′b.

Figure 38:
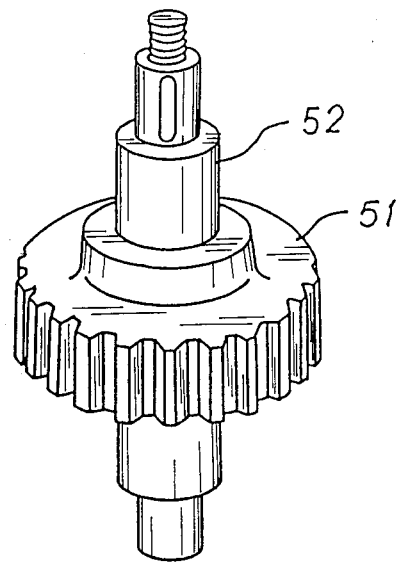
FIGS. 38 through 40 are perspective views showing further examples of finished products, respectively.
Figure 39:
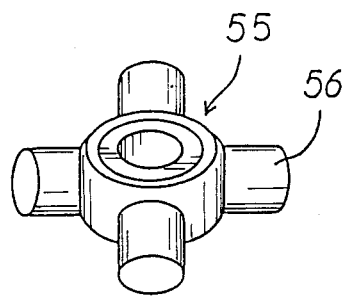
Figure 40:
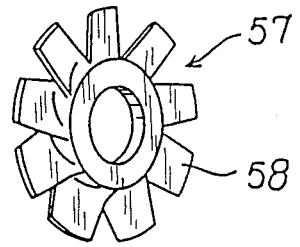

Now, FIGS. 38 through 40 are perspective views showing a still further example of a finished product in accordance with the process of the invention. In FIG. 38, there is shown a case that a shaft 52 is adopted for a sleeve to be installed to a spur gear 51, FIG. 39 showing a journal 55 having four projections 56, FIG. 40 showing an example of a propeller product 57 having a plurality of blades 58 extending radially.

Figure 41:
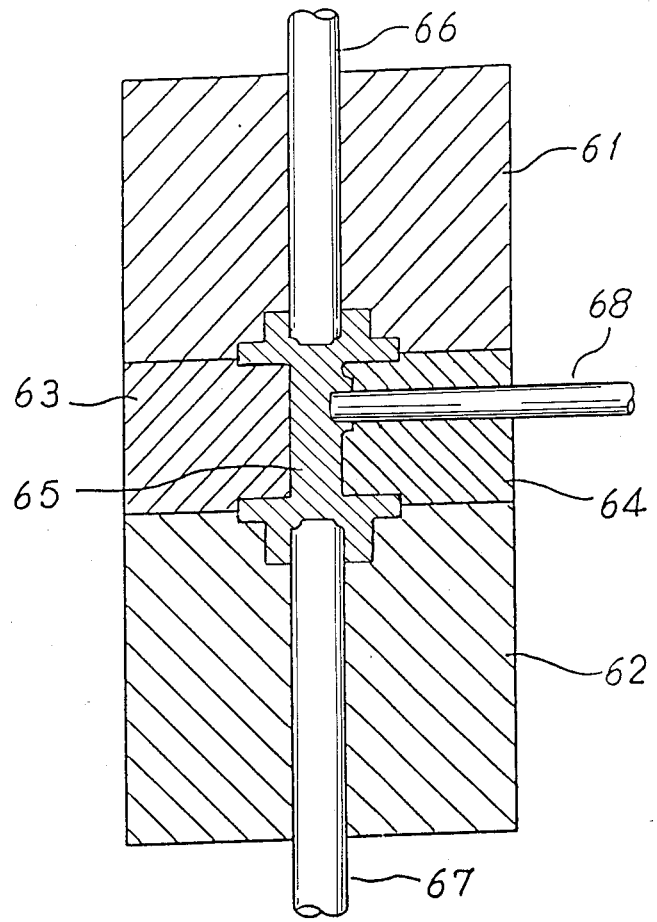
FIG. 41 is a longitudinal cross-sectional view showing the moulding state by way of a further embodiment of the invention.
Figure 42:
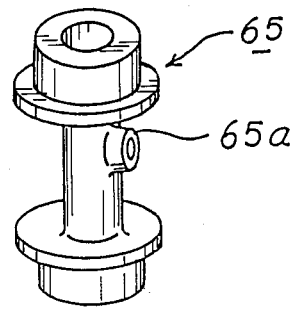
FIG. 42 is a perspective view showing a finished plastic product.

FIG. 41 is a longitudinal cross-sectional view showing a further embodiment of the process according to the invention, in which there is produced a finished product 65 having a projection 65a shown in FIG. 42 from a cylindrical blank by using another punch working in the horizontal direction in addition to upper and lower punches 66, 67. In this embodiment, there is employed an additional mould 63 which may be divided in the lateral direction.

Figure 43:
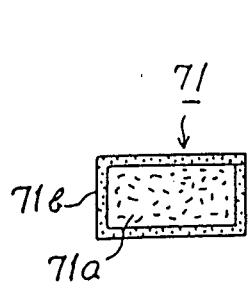
Figure 44:
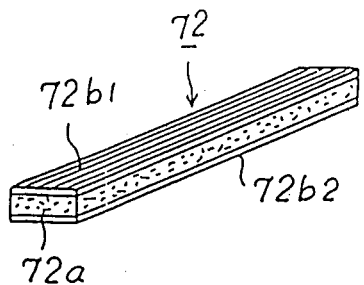
Figure 45:
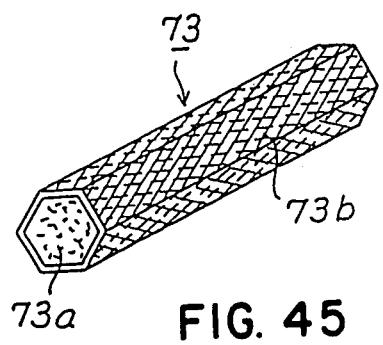
Figure 46:
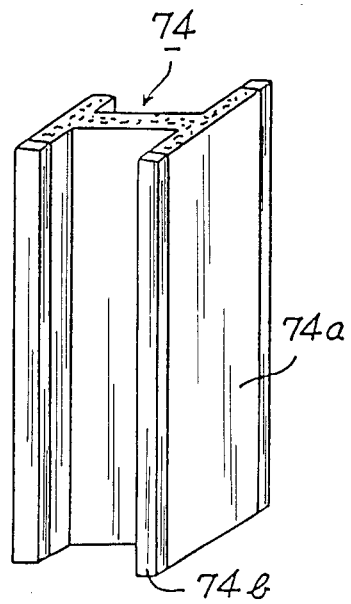
Figure 47:
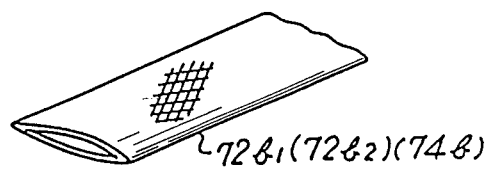
FIG. 47 is a perspective view showing a tubular chord to be employed for an area of long fiber to be embedded in a plastic blank.

FIGS. 43 through 46 show a variety of blanks of a shape other than a cylinder. In FIG. 43, there is shown a rectangular blank 71 having its outer circumference covered with a layer of longer fibers 71b over a layer of short fibers 71a. FIG. 44 is a perspective view showing another blank of rectangular cross-section 72 having only two sides covered with a layer of longer fibers $71b_1$ and $72b_2$ over its core of short fibers 72a; FIG. 45 is a perspective view showing still another embodiment of blank 73 having a hexagonal cross-section and having a layer of longer fibers 73b around a core of short fibers 73a; and FIG. 46 is a perspective view showing a still further embodiment of blank 74 having an H-shaped cross-section and having an area of longer fibers 74b disposed discretely with respect to a core of short fibers 74a. In addition, it is also possible in practice that a sleeve-like braiding arrangement prepared separately is adapted as the areas of longer fibers $72b_1$, $72b_2$ and 74b, respectively.

Figure 48:
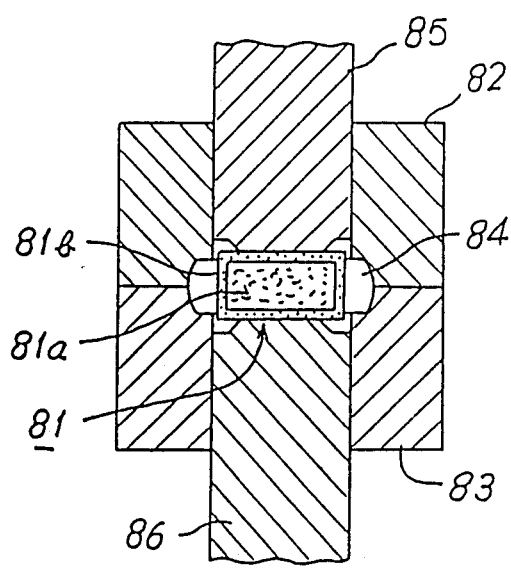
FIGS. 48 and 49 are longitudinal cross-sectional views showing moulding steps by way of a further embodiment of the invention.
Figure 49:
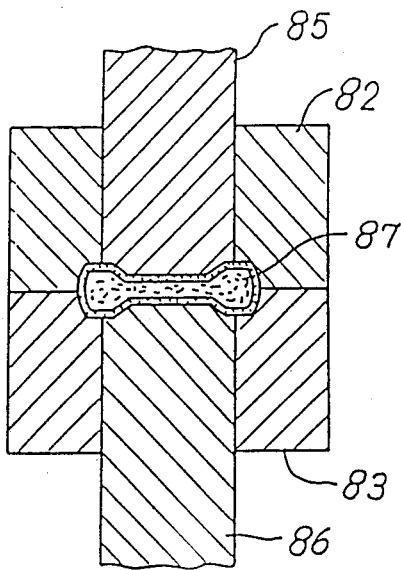
Figure 50:
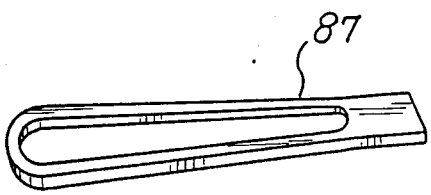
FIG. 50 is a perspective view showing a still further example of a finished product of the invention.

FIGS. 48 and 49 are longitudinal cross-sectional views showing a sequence of moulding procedures for a blank having a rectangular cross-section 81 to be formed to be a handle 87 as shown in FIG. 50 under the compressive force rendered by an opposed pair of compression punches 85, 86. In the figures, there are shown a section of short fibers 81a and a section of longer fibers 81b of the blank 81, and a pair of mould halves 82, 83 having a cavity 84 defined between the mould halves 82, 83.

While the descriptions of these embodiments of the invention are directed exclusively to the use of braiding arrangement provided for the section of longer fibers of the plastic blanks, a knitted cord or lace may equally be applied as an expansible longer fiber structure of the manufacture of a moulding product.

While these embodiments have been described in connection with the closed type moulding processes, the blanks may also be adapted to the existing enclosed forming or the matched die moulding, depending upon the shape of a moulding product.

It is also to be noted that such a known heating process can be used as the effect of dielectric heating by the radio frequency to have the moulding blank heated directly other than by the heat transmission from the mould, in order to shorten the moulding work cycle.

While the embodiments of the invention have been described exclusively on the moulding blanks of fiber-containing plastics, the present invention may also be adapted to the general plastics to an equal effect. (Effect and Function of the Invention)

According to the present invention as reviewed fully in the foregoing descriptions, the fiber-containing plastic moulding blank is moulded preliminarily to a given shape prior to the enclosing mould, there is attainable the product of a homogeneous quality having less bubbles in the finished product in comparison with the products by way of the sheet moulding compound, the bulk moulding compound or the hand lay up processes. For this reason, the thus-prepared product will have excellent properties such as sufficient strength, and the invention makes it easier to produce a final product of good quality.

Also, from the standpoint of industrial application, as the processes of the invention may be adapted with the automated procedures such that the plastic matrix of the moulding blank are prepared by way of the continuous extrusion or drawing processes, and that the section of longer fibers is automatically formed around the outer circumference of the prepared blank by way of the filament winder, the braiding machine, etc., and also that thus-prepared plastic blank is cut automatically to a specified dimension, it is advantageous that these moulding blanks may turn out with less production cost.

In addition, by virtue of advantageous processes according to the invention such that the moulding blank is worked with a compressive force nearer its deforming portion than the conventional compression moulding process adapted to the moulding of products having a relatively complicated shape, and there is no possibility that an ultimate urging force upon the moulding product per se may be reduced as the mould touches upon the burrs of the blank, it is feasible in practice that even a relatively small force may equally work upon the blanks, thus making it possible to work even a product having a complicated shape or containing a higher rate of fibers, and thus ensuring an excellent property of the product, accordingly.

Furthermore, since there is a smaller possibility of burrs being formed during the moulding operation, an excellent yield may be attained, and thus bringing no fear that the strength and rigidity of the product may be reduced by a possible cut of the fibers at the portion of burrs as experienced in the conventional processes. Moreover, according to the improved process of the invention, as it is possible to specifically locate a section of longer fibers at the outer circumference or any other desired areas of the blank, such portions that require a specific property such as strength, wear-resistance, etc. can then be reinforced particularly and efficiently, which feature can then contribute to the economy particularly when a special costly fiber is adapted to use.

Also, according to the advantageous effect of adoption of the section of short fibers with an excellent fluidity and workability in addition to the use of longer fibers in the preparation of a moulding blank as materialized by the invention, it is now possible to provide the area of longer fibers with a further uniform pressure of deformation, thus making it feasible to work a product having a complicated shape with a relatively small compressing force.

In addition, according to the invention, by taking advantage of the expandable section of longer fibers in the continued plane of cross-section of a blank, it is now possible in practice to form a complicated shape, and have an increased strength of a product by defining the orientation of the longer fibers.

Furthermore, in consideration of the fact that the gaps between the strands in the section of longer fibers of a blank may expand when this section is caused to be elongated, there may be obtained the effect of anchoring or entanglement of the short fibers with the meshes of longer fibers, by having the short fibers entered and engaged with these gaps, thus preventing a possibility of departure between the both fibers.

In addition, according to the invention, it is practicable to attain a product free from defects of voids in and recesses on a moulding product, and also to provide a product allowing a variety of sleeves to be inserted therein, by providing a vaccum or reduced pressure in the mould cavity before or during the moulding operation. Also, by applying a compressive force upon a lateral continued side of the blank in addition to the effect of vacuum moulding, it is possible to mould an elongated product having a complicated shape.

What is claimed is:

1. A moulded product of a fiber reinforced plastic, which comprises a core consisting essentially of a plastic matrix admixed with relatively short fibers and an outer circumferential section consisting essentially of a plastic matrix admixed with relatively long fibers, said moulded product being produced by a method which comprises the steps of (1) providing a plastic blank comprising a core section consisting essentially of a plastic matrix admixed with relatively short fibers and an outer circumferential section consisting essentially of a plastic matrix admixed with relatively long fibers, (2) placing said plastic blank into a cavity of a mould, and (3) forcing said blank to be compressed by using forcing punch means so as to promote spreading or charging of said blank into corners of said cavity, while controlling heating of said mould.

2. A moulded product of a fiber reinforced plastic, which comprises a core consisting essentially of a plastic matrix admixed with relatively short fibers and a specific local section consisting essentially of a plastic matrix admixed with relatively long fibers, said moulded product being produced by a method which comprises the steps of (1) providing a plastic blank comprising a core section consisting essentially of a plastic matrix admixed with relatively short fibers and a specific local section consisting essentially of a plastic matrix admixed with relatively long fibers, (2) placing said plastic blank into a cavity of a mould, and (3) forcing said blank to be compressed by using forcing punch means so as to promote spreading or charging of said blank into corners of said cavity, while controlling heating of said mould.

3. A moulded product of a fiber reinforced plastic, as claimed in claim 1 or 2, wherein said relatively long fibers contained in said outer circumferential section or said specific local section are in the form of strands disposed extending obliquely at a given angle of inclination so that they may intercross with each other.

4. A moulded product of a fiber reinforced plastic, as claimed in claim 3, wherein said strands of said relatively long fibers are disposed in a braided manner.

5. A moulded product of a fiber reinforced plastic, as claimed in claim 3, wherein said given angle of inclination of said strands of relatively long fibers is 30 degrees.

6. A moulded product of a fiber reinforced plastic, as claimed in claim 3, wherein said strands of said relatively long fibers are braided with a single strand crossing alternatingly upon another adjacent strand.

7. A moulded product of a fiber reinforced plastic, as claimed in claim 3, wherein said strands of said relatively long fibers are braided with a single strand crossing alternatingly with a unit of two adjacent strands.

8. A moulded product of a fiber reinforced plastic, as claimed in claim 3, wherein said strands of said relatively long fibers are braided with a unit of two adjacent strands crossing every other unit of two adjacent strands.

9. A moulded product of a fiber reinforced plastic, as claimed in claim 3, wherein said strands of said relatively long fibers are disposed in a plurality of layers around said core of relatively short fibers.

10. A moulded product of a fiber reinforced plastic, as claimed in claim 9, wherein said plurality of layers are disposed in combination of said layer of longer fibers and a layer of plastic matrix admixed with relatively short fibers laid one upon another.

* * * * *